(12) United States Patent  (10) Patent No.: US 8,059,131 B1
Bittel et al.  (45) Date of Patent: *Nov. 15, 2011

(54) SYSTEM AND METHOD FOR PACKING DATA IN DIFFERENT FORMATS IN A TILED GRAPHICS MEMORY

(75) Inventors: Donald A. Bittel, San Jose, CA (US); David Kirk McAllister, Holladay, UT (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/175,706

(22) Filed: Jul. 18, 2008

Related U.S. Application Data

(63) Continuation of application No. 11/304,268, filed on Dec. 14, 2005, now Pat. No. 7,420,568.

(51) Int. Cl.
  *G06F 12/02* (2006.01)
  *G06T 15/40* (2006.01)
  *G09G 5/39* (2006.01)

(52) U.S. Cl. ............ 345/544; 345/422; 345/531

(58) Field of Classification Search ............ 345/530, 345/531, 544, 549, 555, 418, 419, 421, 422, 345/581, 589, 592
See application file for complete search history.

(56) References Cited

U.S. PATENT DOCUMENTS

| | | | |
|---|---|---|---|
| 5,109,520 A | 4/1992 | Knierim | |
| 5,394,170 A | 2/1995 | Akeley et al. | |
| 5,408,606 A | 4/1995 | Eckart | |
| 5,452,299 A | 9/1995 | Thessin et al. | |
| 5,485,586 A | 1/1996 | Brash et al. | |
| 5,500,939 A | 3/1996 | Kurihara | |
| 5,572,655 A | 11/1996 | Tuljapurkar et al. | |
| 5,623,688 A | 4/1997 | Ikeda et al. | |
| 5,625,778 A | 4/1997 | Childers et al. | |
| 5,664,162 A | 9/1997 | Dye | |
| 5,696,945 A | 12/1997 | Seiler et al. | |
| 5,781,201 A | 7/1998 | McCormack et al. | |
| 5,898,895 A | 4/1999 | Williams | |
| 5,905,877 A | 5/1999 | Guthrie et al. | |

(Continued)

OTHER PUBLICATIONS

Bittel, U.S. Appl. No. 11/304,268, filed Dec. 14, 2005 for "System and Method for Packing Data in Different Formats in a Tiled Graphics Memory." Office Actions mailed Oct. 4, 2006, Apr. 25, 2007, Aug. 14, 2007, Dec. 27, 2007.

(Continued)

*Primary Examiner* — Joni Hsu (74) *Attorney, Agent, or Firm* — Cooley LLP (57) ABSTRACT

A tiled graphics memory permits graphics data to be stored in different tile formats. One application is selecting a tile format optimized for the data generated for particular graphical surfaces in different rendering modes. Consequently, the tile format can be selected to optimize memory access efficiency and/or packing efficiency. In one embodiment a first tile format stores pixel data in a format storing two different types of pixel data whereas a second tile format stores one type of pixel data. In one implementation, a z-only tile format is provided to store only z data but no stencil data. At least one other tile format is provided to store both z data and stencil data. In one implementation, z data and stencil data are stored in different portions of a tile to facilitate separate memory accesses of z and stencil data.

5 Claims, 11 Drawing Sheets

U.S. PATENT DOCUMENTS

| | | | |
|---|---|---|---|
| 5,923,826 | A | 7/1999 | Grzenda et al. |
| 6,104,417 | A | 8/2000 | Nielsen et al. |
| 6,115,323 | A | 9/2000 | Hashimoto |
| 6,157,963 | A | 12/2000 | Courtright et al. |
| 6,157,989 | A | 12/2000 | Collins et al. |
| 6,172,670 | B1 | 1/2001 | Oka et al. |
| 6,202,101 | B1 | 3/2001 | Chin et al. |
| 6,205,524 | B1 | 3/2001 | Ng |
| 6,219,725 | B1 | 4/2001 | Diehl et al. |
| 6,384,822 | B1 | 5/2002 | Bilodeau et al. |
| 6,469,703 | B1 | 10/2002 | Aleksic et al. |
| 6,545,684 | B1 | 4/2003 | Dragony et al. |
| 6,570,571 | B1 | 5/2003 | Morozumi |
| 6,580,427 | B1 | 6/2003 | Orenstein et al. |
| 6,614,444 | B1 | 9/2003 | Duluk et al. |
| 6,674,430 | B1 | 1/2004 | Kaufman et al. |
| 6,717,576 | B1 | 4/2004 | Duluk et al. |
| 6,778,181 | B1 | 8/2004 | Kilgariff et al. |
| 6,781,600 | B2 * | 8/2004 | Anwar ............... 345/629 |
| 6,853,382 | B1 | 2/2005 | Van Dyke et al. |
| 7,129,941 | B2 | 10/2006 | Deering et al. |
| 7,129,956 | B2 * | 10/2006 | Hollis et al. ............ 345/592 |
| 2003/0067467 | A1 | 4/2003 | Wilt et al. |
| 2003/0095127 | A1 | 5/2003 | Blais |
| 2004/0189652 | A1 | 9/2004 | Emberling |

OTHER PUBLICATIONS

Van Dyke, U.S. Appl. No. 10/740,229, filed Dec. 17, 2003 for "System and Method for Packing Data in a Tiled Graphics Memory." Office Actions mailed Mar. 1, 2005, Aug. 24, 2005, Aug. 8, 2006, Feb. 21, 2007.

* cited by examiner

|   |   |   |   |   |   |   |   | type |
|---|---|---|---|---|---|---|---|---|
| Z | 00: | 005:a | 004 | 003 | 002 | 001 | 000 | 0 |
|   | 01: | 00A:ab | 009 | 008 | 007 | 006 | 005:bc | 1 |
|   | 02: | 00F | 00E | 00D | 00C | 00B | 00A:c | 2 |
|   | 03: | 015:a | 014 | 013 | 012 | 011 | 010 | 0 |
|   |   |   |   |   |   |   |   |   |
|   | 04: | 01A:ab | 019 | 018 | 017 | 016 | 015:bc | 1 |
|   | 05: | 01F | 01E | 01D | 01C | 01B | 01A:c | 2 |
|   | 06: | 025:a | 024 | 023 | 022 | 021 | 020 | 0 |
|   | 07: | 02A:ab | 029 | 028 | 027 | 026 | 025:bc | 1 |
|   |   |   |   |   |   |   |   |   |
|   | 08: | 02F | 02E | 02D | 02C | 02B | 02A:c | 2 |
|   | 09: | 035:a | 034 | 033 | 032 | 031 | 030 | 0 |
|   | 0A: | 03A:ab | 039 | 038 | 037 | 036 | 035:bc | 1 |
|   | 0B: | 03F | 03E | 03D | 03C | 03B | 03A:c | 2 |

*FIG. 9*

```
        N  00: 003 002 001 000              type
           01: 007 006 005 004              0
           02: 00B 00A 009 008              0
           03: 00F 00E 00D 00C              0
                                            0
```

*FIG. 10*

```
        N  00: 005:a 004 003 002 001 000                                        type
           01: 00A:ab 009 008 007 006 005:bc                                    0
           02: 00F 00E 00D 00C 00B 00A:c                                        1
           03: 00F 00E 00D 00C 00B 00A 009 008 007 006 005 004 003 002 001 000  2
                                                                                3
```

*FIG. 11*

| S0, S1, S2, S3<br>d0 | S4, S5, S6, S7<br>d1 |
|---|---|
| $z0 + \frac{1}{3}z1$<br>d2 | $\frac{2}{3}z1 + \frac{2}{3}z2$<br>d3 |
| $\frac{1}{3}z2 + z3$<br>d4 | $z4 + \frac{1}{3}z5$<br>d5 |
| $\frac{2}{3}z5 + \frac{2}{3}z6$<br>d6 | $\frac{1}{3}z6 + z6$<br>d7 |

*FIG. 12*

SYSTEM AND METHOD FOR PACKING DATA IN DIFFERENT FORMATS IN A TILED GRAPHICS MEMORY

CROSS REFERENCE TO RELATED APPLICATIONS

This application is a continuation of U.S. application Ser. No. 11/304,268, filed Dec. 14, 2005, which application is a continuation-in-part of U.S. application Ser. No. 10/740,229, filed on Dec. 17, 2003, the contents of which are hereby incorporated by reference.

FIELD OF THE INVENTION

The present invention is generally directed towards packing data in a tiled graphics memory. More particularly, the present invention is directed towards packing z data, stencil data, color data, and alpha data in a tiled graphics memory.

BACKGROUND OF THE INVENTION

Graphics systems sometimes employ tiling to store pixel data in a graphics memory. Tiling is a memory addressing mode in which a square or rectangular pixel area is mapped into consecutive addresses to improve memory access coherence. The number of pixels associated with an individual the may vary depending upon the design of the graphics system. A tile commonly includes different types of graphical data. In some graphics processing units (GPUs), tiles are used to store combined z data (also known as depth data) and stencil data (also known as "s" data). A common tile format is 24 bit Z data and 8 bit stencil ("Z24S8").

A drawback of conventional tiling techniques is that the reading, writing, clearing, and compression of tile data is not as efficient as desired. In some graphics systems, such as graphics systems with 24 bit z data, z data may not pack efficiently into tiles. A similar problem exists in regards to graphics systems storing 24 bit color data (i.e., red-green-blue RGB color space data) and associated alpha (opacity) data.

Figure 1:
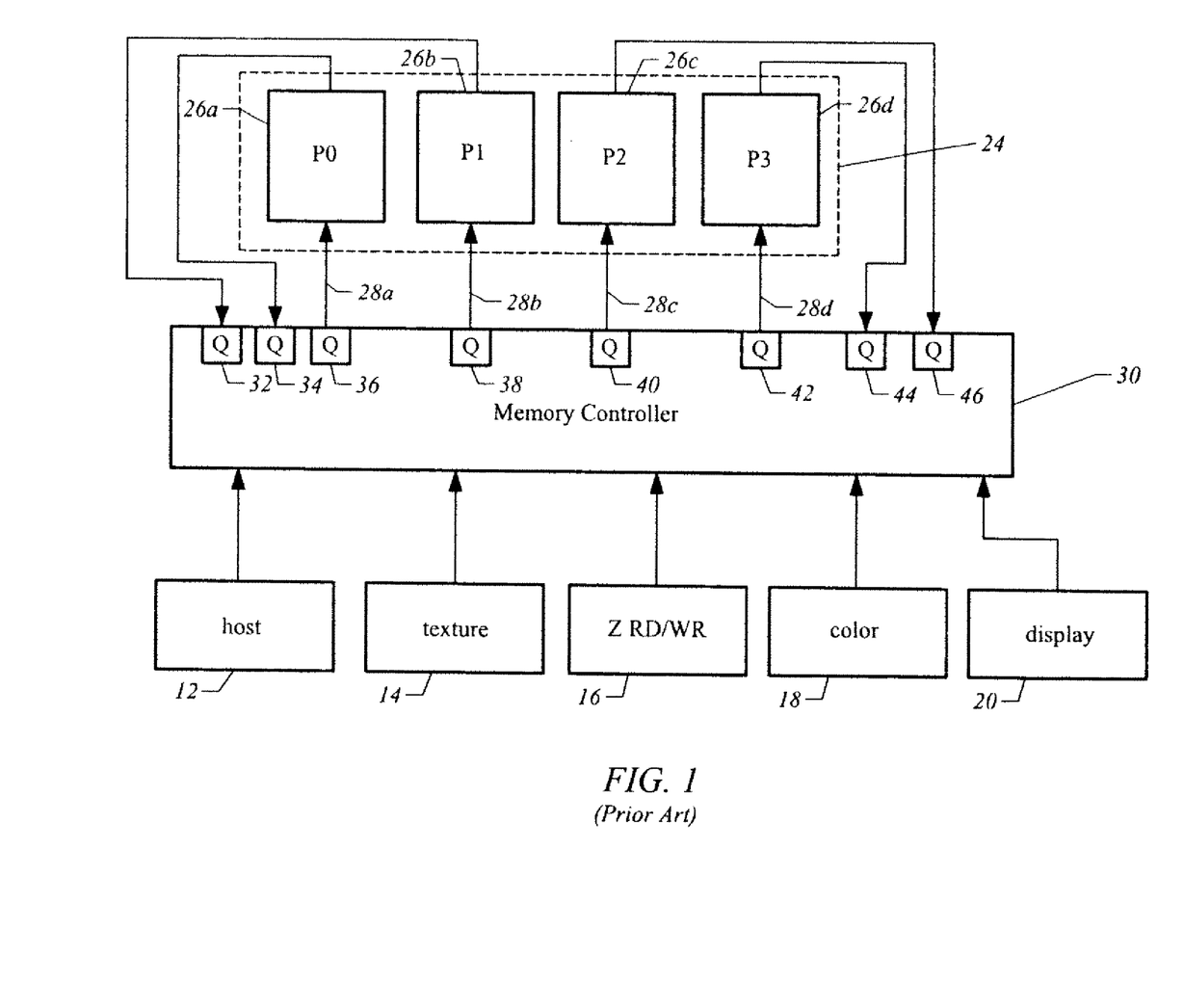
FIG. 1 is a block diagram of a prior art partitioned memory system.

One problem with conventional tiling techniques is related to storing and accessing tile data from a partitioned memory. Graphics systems increasingly use partitioned memory systems to provide efficient memory accesses when the memory system is wide and consists of multiple memory chips. FIG. 1 illustrates a partitioned memory described in more detail in U.S. patent application Ser. No. 09/687,453, entitled "Controller For A Memory System Having Multiple Partitions," commonly assigned to the assignee of the present invention, the contents of which are hereby incorporated by reference. In the partitioned graphics memory of FIG. 1, the physical memory is a memory array 24 comprising two or more operable partitions 26a, 26b, 26c, and 26d. Each memory partition has its own individual bus 28a, 28b, 28c, and 28d connecting it to a memory controller 30. The memory controller 30 includes queues 32, 34, 36, 38, 40, 42, 44, and 46 and control logic (not shown) to determine routing to the partitions such that the partitioned memory appears as a non-partitioned memory to clients, such as host 12, texture 14, z read/write module 16, color module 18, or display 20.

There are a number of challenges to supporting tiling in a multi-partitioned memory system. First, each tile must be wholly contained in a partition. Another problem associated with tiled memories is providing efficient storage and memory access in graphics systems supporting different data types and modes of operation. GPUs are increasingly designed to support different data types and different rendering modes. For example, as described in U.S. patent Ser. No. 10/740,229, a graphics system may support modes in which only one type of data, such as z data, is accessed from a tiled memory. However, conventional tiling techniques tend to have drawbacks when used in graphics systems that support different data types and modes of operation. It is difficult to simultaneously achieve a high packing efficiency and good memory access efficiency. In particular, it is difficult to provide efficient packing and bandwidth for pixel data types containing z (with and without stencil) and color (with and without alpha).

Therefore, what is desired is an improved apparatus, system, and method for utilizing tiles in a graphics memory, including partitioned and non-partitioned graphics memories.

SUMMARY OF THE INVENTION

A tiled graphics memory supports at least two different tile formats. The two different tile formats may be advantageously selected to improve memory access efficiency and/or storage. In one embodiment, one tile format stores only the z data component but no stencil data while at least one other tile format stores z data and stencil data. In one embodiment one of the tile formats permits z data and stencil data to be stored in different portions of a tile. This permits z data to be accessed independently of stencil data. Other applications include different tile formats storing pixel data with different bit widths and different tile formats for storing either RGB-alpha data or RGB data without alpha.

One embodiment of a method for utilizing a tiled graphics memory in a graphics system includes providing at least two different tile formats for storing pixel data in regions of a tiled memory. Each tile format is structured for efficient access and/or storage of graphics data having selected attributes. A tile format is selected to improve memory access efficiency or packing efficiency.

One embodiment of an apparatus comprises a memory controller. The memory controller is configured to organize pixel data for groups of pixels into at least two different tile formats. Each tile format is structured for efficient access or storage of graphics data having selected attributes. A tile mode format selector selects a tile format to improve memory access efficiency and/or packing efficiency.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
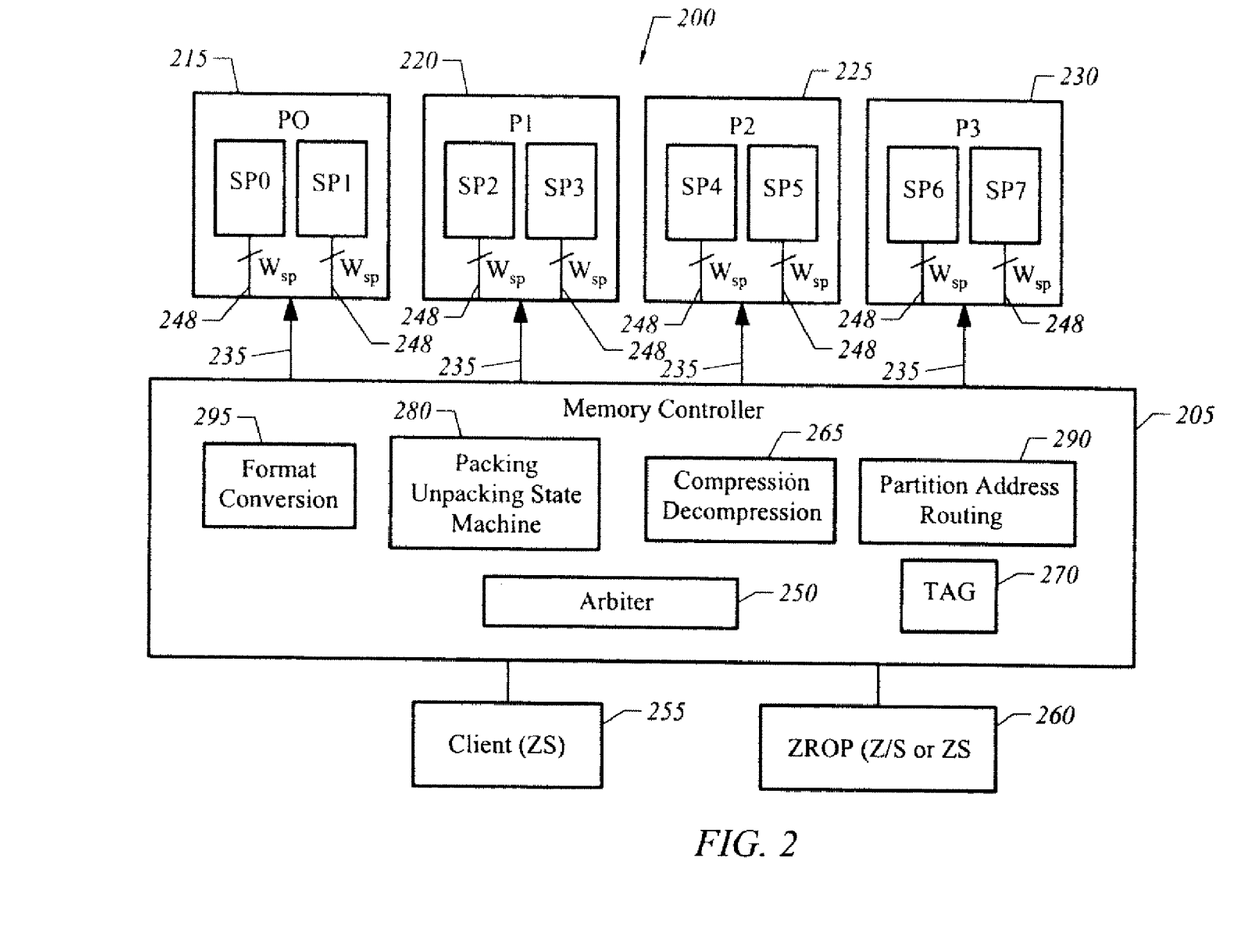
FIG. 2 is a block diagram of a tiled memory system in accordance with one embodiment of the present invention.

The present invention includes an apparatus, system, method, and data structure for utilizing tiles in a graphics memory. FIG. 2 is a block diagram illustrating a memory system 200 for organizing tile data in accordance with one embodiment of the present invention. In one embodiment, memory system 200 is a partitioned memory system, although it will be understood throughout the following discussion that embodiments of the present invention include a non-partitioned memory or a memory having a different arrangement of partitions than those illustrated in FIG. 2. Memory system 200 includes two or more memory partitions. Each partition P0 215, P1 220, P2 225, and P3 230 is coupled to a memory controller 205 by its own respective data bus 235. Data bus 235 has a memory byte width, $W_p$, with an associated packet width for addressing locations within the partition. In accord with a common usage in the graphics industry, a packet is a unit of data transfer.

In turn, each partition may have two or more sub-partitions, such as sub-partitions SP0 240A and SP1 240B. Each sub-partition 240A and 240B has its own respective sub-bus 248 with a corresponding byte width for sub-packets, $W_{sp}$, addressed to a memory location in the sub-partition. Thus, in a single memory access to a partition, Pi, a single memory access may be made to each of its sub-partition SPi. The sub-partitions are thus the minimum addressable unit of the graphics system. In one embodiment, each sub-partition is a double data rate (DDR) random access memory (RAM). As an illustrative example, each partition may have 64 data pins whereas each sub-partition 240A or 240B has 32 data pins. This permits, for example, a 64 bit partition to be implemented as two 32 bit memory chips.

An individual tile represents tile data stored in memory locations of one of the partitions. The tile data stored in one partition is further distributed among the sub-partitions contained within the partition.

The memory controller 205 routes addresses of requests from individual clients of a graphics system to specific partition/sub-partition memory locations. The individual clients may be any component within a graphics processing system that requires access to a graphics memory to read, write, clear, or compress tile data, such as a z-raster operations (ZROP) module or a color raster operations (CROP) module.

In one embodiment, an arbitration module 250 selects a client. In one embodiment, the client is a portion of the graphics system expecting a standard data format in which two types of data for each pixel are stored in each data section of a tile. Alternatively, as described below in more detail, a client 260 may be a portion of the graphics system that can be adapted to accept the two types of data as residing in separate portions of a tile, such as separate stencil and z data. In one embodiment, client 260 is a ZROP module and client 255 is a CROP module.

A partition address routing module 290 maps an address associated with a client (e.g., a read or write request) to a memory location in a partition and its associated sub-partitions. A compression/decompression module 265 may be included to compress and decompress tile data to reduce memory bandwidth requirements. A tag module 270 may be included to identify, by a tag (e.g., one or more bits) attributes of the tiles, such as whether a tile holds data in a compressed format. A packing/unpacking state machine 280 and format conversion module 295 are provided to reorganize tile data. During a packet process, packing/unpacking state machine 280 and format conversion module 295 may be used to pack data in arrangements described below. The same modules preferably permit an unpacking procedure to be performed to reformat data into a format expected by a client. For example, for client 255, packing/unpacking state machine 280 and format conversion module 295 may generate combined z data and stencil data from separate z and stencil data stored in the tile. Thus, packing/unpacking state machine 280 and format conversion module 295 permit the data to be arranged within a tile in more efficient ways while also providing clients access to tile data in a format expected by a client 255.

Figure 3:
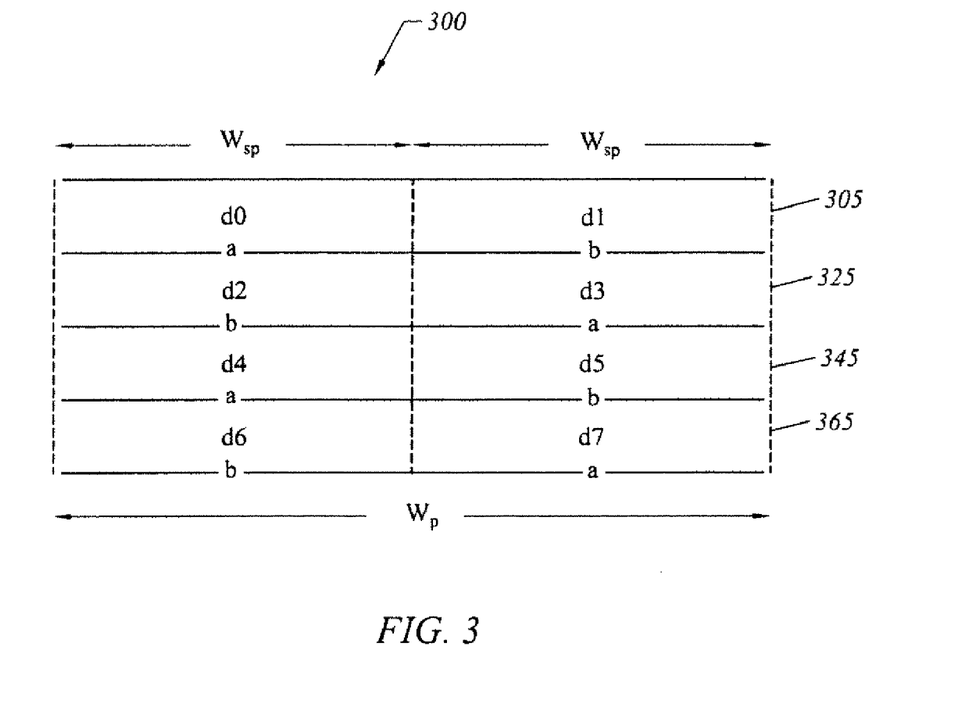
FIG. 3 illustrates a tile in accordance with one embodiment of the present invention.

FIG. 3 illustrates one embodiment of a tile 300 for storing two different types of pixel data, such as z data and stencil data in memory system 200. Tile 300 corresponds to the data from a plurality of scan lines 305, 325, 345, and 365 organized into data sections for storing tile data for a group of pixels. As previously described data bus 235 has a memory byte width, $W_p$, with an associated packet width for addressing locations within the partition and each partition may have two or more sub-partitions with a corresponding byte width for sub-packets, $W_{sp}$. In one embodiment, the tile has a total byte width, $W_p$, corresponding to the data packet width of an individual memory partition. Tile 300 is divided into data sections d0, d1, d2, d3, d4, d5, d6, and d7 each having a byte width $W_{sp}$ (which can also be described as a byte size), corresponding to the data sub-packet width of a memory sub-partition. Conceptually, tile 300 has a width corresponding to the amount of data that can be accessed in a full packet and the individual data sections can be thought of as corresponding to the amount of data that can be accessing using an individual sub-packet. Thus, in the example illustrated, four memory accesses to a partition are sufficient to access all of the data sections of tile 300 for a read, write, clear, or compress operation.

Figure 4:
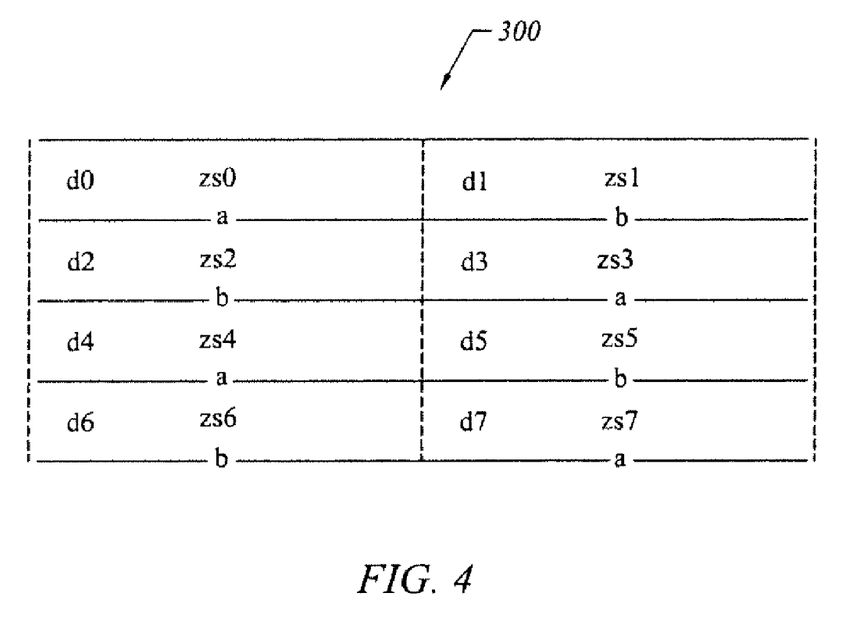
FIG. 4 illustrates the tile of FIG. 3 with combined z, s data.

Tile 300 may be used to store combined z, s data. FIG. 4 illustrates an embodiment of tile 300 in which each data section, $d_i$, of the tile stores combined z,s data, as represented by entries zsi stored in each data section di.

Each z and s illustrated in FIG. 4 may represent the z and stencil data for an individual pixel or a rectangle of pixels, depending upon the data requirements for z data and pixel data with respect to the sub-packet width. For example, with 24 bit z and 8 bit stencil, only 32 bits are needed to represent z, s data for one pixel. In one embodiment, tile 300 is a 32 byte by 4 scan line tile having a sub-packet width of 16 Bytes by 1 scan line corresponding to a single memory access of a 32 bit DDR RAM memory sub-partition.

It is desirable that at least some of the pixels of an individual tile map onto the same DRAM page to improve memory coherence. For a partitioned memory in which each partition has two sub-partitions 240A and 240B, it is advantageous to assign each data section of the tile one of the two possible sub-partition types (i.e., either an a-type or a b-type). As illustrated in FIG. 4, in one embodiment each data section is further assigned as either an "a" data section or a "b" data section. In any single data access to a partition, an (a, b) pair of the tile may be addressed, which corresponds, in physical memory, to accessing one "a" sub-partition and one "b" sub-partition of the partition holding the tile data.

Figure 5:
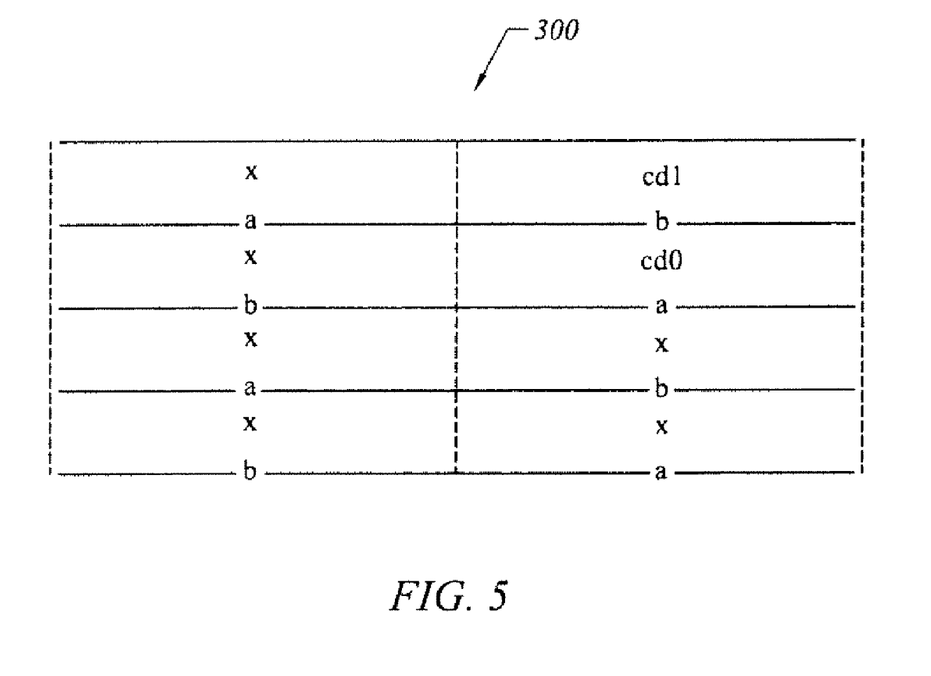
FIG. 5 illustrates the tile of FIG. 3 with compressed data.

As illustrated in FIG. 5, in one embodiment in which z and stencil data are combined, a compression algorithm may be used to compress the combined z data and stencil data. Using a 4:1 compression algorithm, this results in the data being compressed to compressed entries cd1, and cd0.

Figure 6:
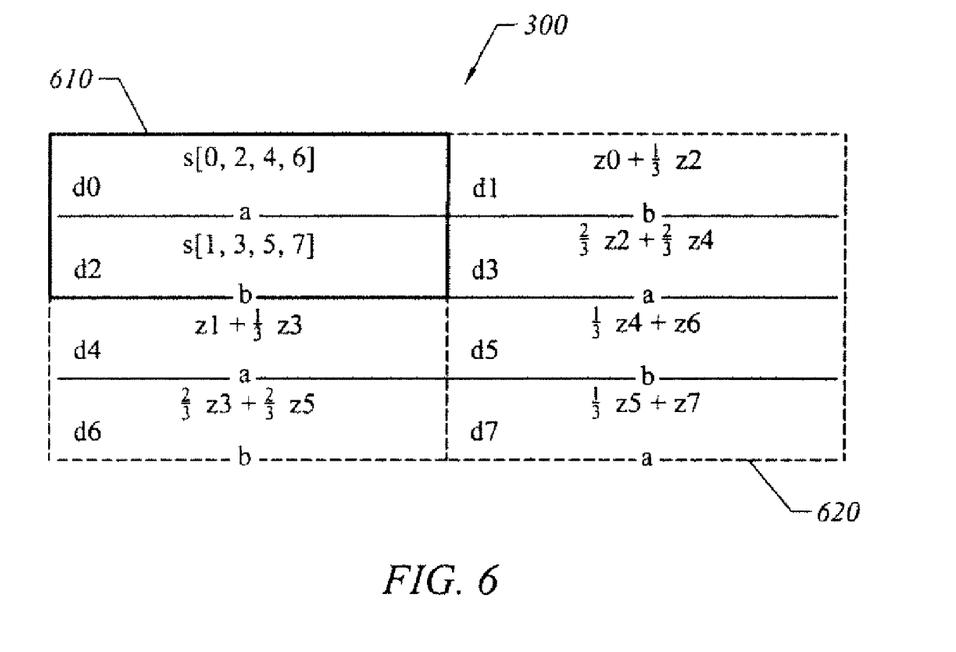
FIG. 6 illustrates the tile of FIG. 3 with z and s data organized into different portions of the tile.

FIG. 6 illustrates an embodiment in which z data and stencil data are packed into different data sections of tile 300. Stencil data is packed into a first portion 610 of the tile, comprising one or more data sections, such as sections d0 and d2. Z data is packed into a second portion 620 of the tile comprising the remaining data sections of the tile, such as sections d1, d3, d4, d5, d6, and d7. The stencil data in data sections d0 and d2 includes a plurality of stencil bytes, where S[i] is the stencil byte corresponding to a z byte, zi. The number of data sections required for stencil data will depend upon the byte width of each data portion and the number of bytes required for stencil data for each pixel.

In an exemplary embodiment, the z data is 24 bit z data and the stencil data is 8 bit stencil data. Thus combined z, s data that would normally fit into eight data sections may be repacked in the tile such that two of the data sections (e.g., data sections d0 and d2) are packed with stencil data and the remaining six data sections (e.g., data sections d1, d3, d4, d5, d6, and d7) are packed with z data.

The z data may be packed in the second portion 620 in a variety of ways. However, it is more efficient, in terms of memory accesses, to apportion the z data such that memory access to a partition (i.e., a single (a, b) pair lookup for a partition with two sub-partitions) is sufficient to access any single z value. Thus, in the example of FIG. 6, whenever z data is split across two data sections, the data is interleaved in an (a,b) pair of data sections. Thus, for example, z2 is split across the (a,b) pair of data sections d1 and d3. Similarly, stencil data is interleaved across an (a,b) pair of data sections.

In the embodiment illustrated in FIG. 6, each data section d1, d3, d4, d5, d6, and d7 in second portion 620 includes z data for two different zi's. One or more rules is applied to arrange the z data. In one embodiment, the z values are sorted by an index into the sub-packet. An individual z value may remain whole (e.g., z0, z1, z6, and z7) or be split across sub-packets (e.g., z2, z3, z4, and z5). In one embodiment, for z values split across sub-packets, the most significant bits are preferably in the sub-packet with the higher number.

The z data is also preferably packed to minimize the number of memory accesses required to access combinations of z data values and stencil values. Separating the stencil data into two a,b data sections permits all of the stencil data to be read in a single (a,b) pair lookup of a memory partition. Thus, for data operations that require only stencil data, efficiency is improved compared to storing combined z, s data, for which case four (a,b) pair lookups would be required to access all of the stencil data of the tile. An example of an application that benefits from storing stencil data separately from z data is a stencil-only rendering mode, which may occur during stencil creation for shadow volume rendering.

One benefit of storing z data separately in the tile is that it takes only three accesses, not four, to read or write all of the z data. Thus, in systems for which z data may be used independently of stencil data, a smaller number of data accesses are required compared with storing combined z and stencil data in each data section. Storing z data separately in the tile is also useful for a z-only rendering mode, corresponding to a z buffer creation phase, for which it is advantageous to access only z data.

Additionally, storing z data separately from stencil data is useful in modes of operation in which there is a read operation requiring one type of tile data and a write requiring the other type of data. For example, in one mode of z and stencil rendering there is reading but not writing of z data. In the same mode, there may be clearing of stencil data, which corresponds to writing, not reading stencil data. By separating z data and stencil data, one direction of input/output accesses is eliminated, reducing the total number of memory accesses that are required to read z data and write stencil data.

As previously described, in one embodiment z data is split across two (a,b) data sections such that a single a, b pair lookup may be used to access any individual z data value to perform a read, write, or clear operation. For example, referring to FIG. 6, z0 may be read by reading the d1 data section; z1 by reading the d4 data section; z2 may be read by reading the d1 and d3 data sections; z3 may be read by reading the d4 and d6 data sections; z4 may be read by reading the d5 and d7 data sections; z5 may be read by the d6 and d7 data sections; z6 may be read by reading the d5 data section; and z7 may be read by reading the d7 data section.

This arrangement of data permits a large number of pairs of z values to be accessed for a read, write, or clear operation in two (a,b) pair lookups, as summarized in Table 1. In two accesses, z2 and z3 may be read; z2 and z4 may be read; z3 and z5 may be read; zs0, zs1, zs4, and zs6 may be read; or zs1, zs3, zs5, and zs7 may be read. This corresponds to accessing four 4×2 pixel rectangles and two of the 8×2 pixel rectangles in one reference, where a 4×2 pixel rectangle is 4 wide pixels wide by 2 pixels high and an 8×2 pixel rectangle is 8 pixels wide by 2 pixels high.

TABLE 1

Table of Data sets available in One Or Two Memory Accesses

| Data Sets Accessible In One Access | Data Sets Accessible In Two Accesses |
|---|---|
| z0 and z1 | z2, z3 |
| z0 and z2 | z2, z4 |
| z1 and z3 | z3, z5 |
| z4 and z6 | z4, z5 |
| z5 and z7 | zs0, zs2, zs4, zs6 |
| z6 and z7 | zs1, zs3, zs5, zs7 |
| s[0, 2, 4, 6] and s[1, 3, 5, 7] | |

Figure 7:
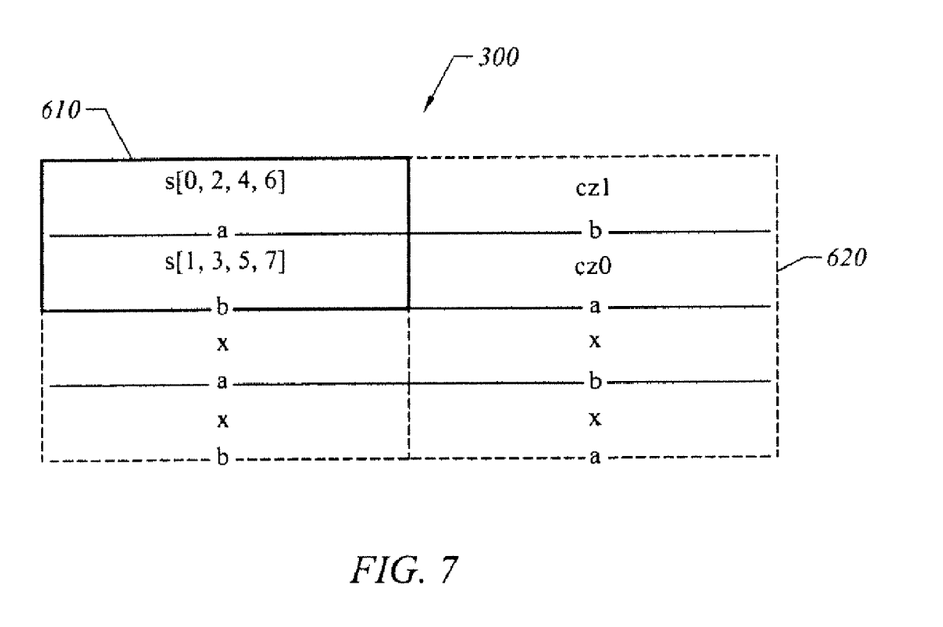
FIG. 7 illustrates the tile of FIG. 3 with stencil data in one portion of the tile and compressed z data in another portion of the tile.

Storing stencil data in separate sections of the tile than z data also provides benefits in regards to data compression. FIG. 7 illustrates a tile in which z data is compressed and stored in separate data sections of the tile using a 3:1 compression algorithm. This results in the compressed z data being held in two data sections of second portion 620 as compressed z data sections, cz0 and cz1. Stencil data is held in uncompressed form in first portion 610. This compression scheme provides several benefits. First, a reference to write stencil data does not require uncompressing z data, as would be required if the tile data sections held compressed combined z, s data. Thus, this arrangement of uncompressed stencil data and compressed z data is beneficial in applications that have a mode in which there are memory accesses for only stencil data. Second, in some applications, z data for a pixel is compressible whereas stencil data is incoherent with respect to the z data for the pixel. As a consequence, the compression success rate for lossless compression may be improved by compressing only the separate z data values.

A fetchmask may be used to fetch z or stencil values of interest. In one embodiment, an 8 bit fetchmask has a bit[i] corresponding to coverage of sub-packet i. In this embodiment, the ROP writes and the frame buffer returns 32 bit data using the following exemplary algorithm: 1) construct an ordered list of covered sub-packets from sub-partition a (0, 3, 4, 7) and from sub-partition b (2, 1, 6, 5); 2) place the lists side by side with the list (0, 3, 4, 7) occupying the least significant bits of any 256 bit data bus; 3) pack sub-packet pairs by going down the list, with the first sub-packet from the sub-partition a list being sub-packet 0 and the first sub-packet from the sub-partition b list being sub-packet 2; and 4) if there is no a or b match for an item in the list, leave that packet uncovered. The process is continued until all sub-packets have been sent.

One or more tile codes may be used to record the status of a tile. In one embodiment, the tile code is a binary number. For example, a tile code of 00 may be used to indicate no compression, stencil stored separately from z. A tile code of 01 may be used to indicate that z compression, stencil stored separately from z. Still another code, such as a tile code of 11, may be used to indicate that the tile stores data in a combined z, s format.

The permuting of data into the separate z and stencil format may be performed in a variety of ways. Combined z, s data from a graphics pipeline may be permuted during rendering, upon read, or upon writes to pack the data into separate portions of the tile. Alternatively, a graphics pipeline may be adapted to output pixel data in the separate z, s format.

While an embodiment of present invention has been described in detail in regards to tiles having z data and stencil data, more generally it will be understood that the present invention includes embodiments having other sets of tile data, such as separate alpha/color data.

It will also be understood that tile data may be arranged into a separate z, s format in graphics memory systems which are not sub-partitioned, such as a graphics memory having either no partitions or partitions but no sub-partitions. As an illustrative example, suppose a minimum memory access size is 32B for a non-partitioned memory. A 32 B×4 tile of combined z/stencil may be arranged into a 32B stencil data section in a first portion of the tile and three 32B z data sections in a second portion of the tile.

In some circumstances only z data (but no stencil) needs to be stored for a group of pixels. This circumstance arises, for example, for graphical surfaces that do not require stencil data. As one example, stencil data is typically not required for shadow maps, which are increasingly being used in certain types of graphics programs and games.

While the previously described tile formats could be used to store z data for surfaces that do not require stencil data, the storage efficiency would be less than desired because there would be data portions of each tile reserved for stencil data that would not be used. Consequently, in one embodiment an additional tile format is included to efficiently pack z data for surfaces requiring only z data but no stencil data.

Figure 8:
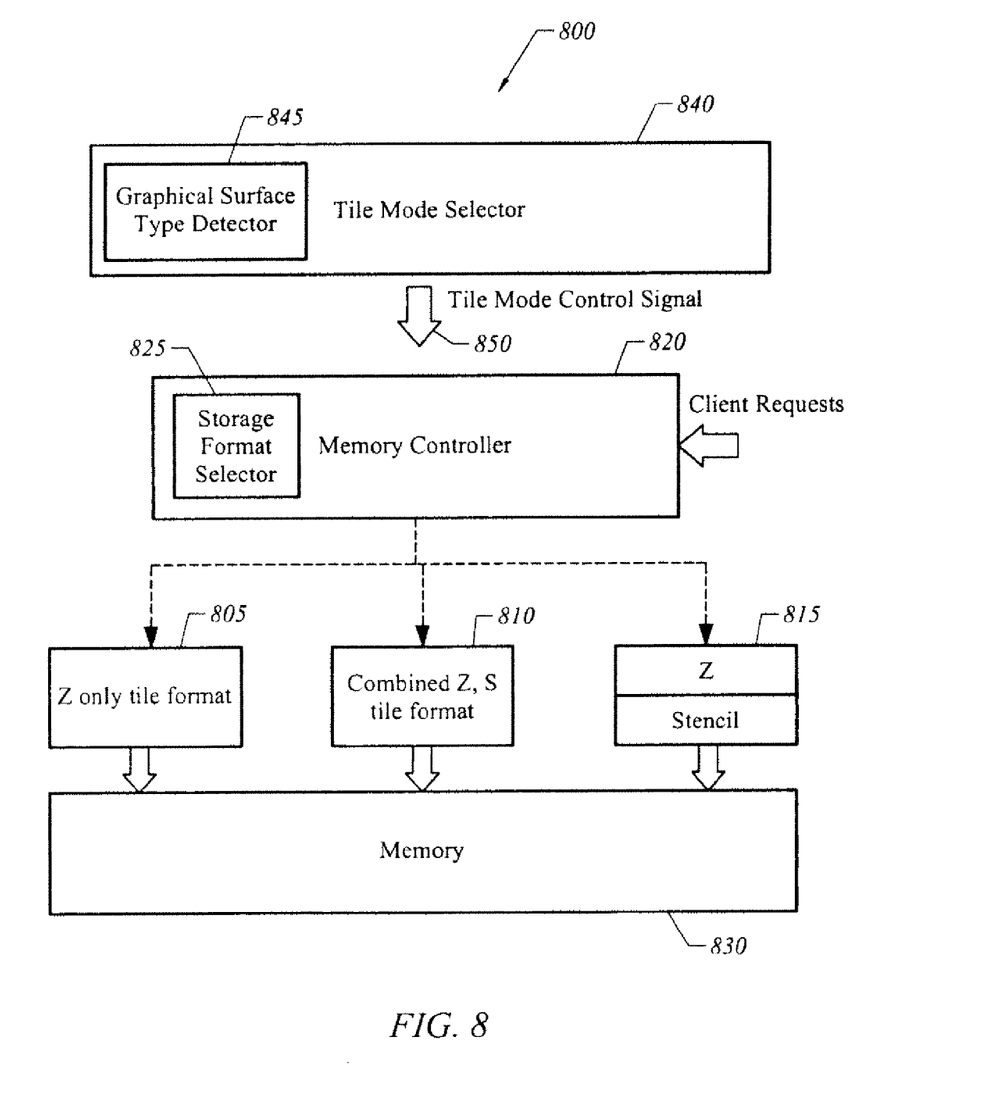
FIG. 8 is a block diagram of a graphics system supporting different tile formats in accordance with one embodiment of the present invention.

FIG. 8 is a block diagram of a graphics memory system 800 supporting a plurality of different tile formats. In a graphics system different rendering modes may be supported, some of which may not require certain types of data or which may require a different number of bits. Graphics memory system 800 permits the tile format to be selected based on the data type or other considerations. That is, instead of always packing pixel data into the same tile format, the tile format can be selected to improve memory access efficiency and packing efficiency, or for other reasons, such as to support particular rendering modes or because of the characteristics of the memory bus interface utilized to access data.

As one example the tile formats in graphics memory system 800 may for example, correspond to tile formats to optimize packing efficiency and/or memory access efficiency for different pixel data bit widths. This permits different tile formats to be used based on the number of bits used for representing z, s, RGB color space data, and alpha (opacity) data. For example, different tile formats may be included for 24 bit, 32 bit or 64 bit formats, such as 48 bits of color and 16 bits of alpha; 24 bits of color and 8 bits of alpha; 32 bit z and 8 bits of stencil; 24 bit z and 8 bits of stencil.

As another example, the tile formats in graphics memory system 800 may include a first tile format storing two different types of pixel data whereas a second tile format is dedicated to store only one of the two types of pixel data. As an illustrative example, in some applications stencil data is not required such that packing efficiency is improved by supporting two different tile formats, one tile format having z, s data and the other dedicated to storing only z data. Similarly, some applications may include a tile format for red-green-blue (RGB) and alpha data and a separate tile format dedicated to only RGB data.

The tile formats in graphics memory system 800 may be selected to include separate tile formats for compressed and uncompressed data. Alternatively individual tile formats may be selected to store either compressed or uncompressed data.

The tile formats in graphics memory system 800 may also be selected based on attributes of the bus interface used to access data from memory. For example the Peripheral Component Interface Express (PCI-E) standard, described below in more detail, transfers data in integer multiples of eight bytes. Consequently, the tile formats may include different tile formats that depend on the minimum data access size of a particular memory interface used to fetch data. For example, in a PCI-E implementation the tile format may be selected such that data fetches can be performed from contiguous regions of memory having one address range. Thus, in PCI-E implementation the tile format may be selected to provide efficient data access via a PCI-E bus such that all of the data accesses for a particular tile map to a single DRAM page having one address range.

In one embodiment, a first tile format 805 corresponds to a tile format storing z data but no stencil data. A second tile format 810 may be included corresponding to combined z and stencil data distributed throughout the tile. A third tile format 815 corresponds to a tile format in which z and stencil data are located in different portions of the same tile such that the z data and stencil data are independently addressable. It will also be understood that any of the previously described tile formats may also be supported by system 800. Each tile represents data for a group of adjacent pixels that is stored in a contiguous region of memory 830.

Memory controller 820 includes a storage format selector 825. Memory controller 820 may also include any of the features previously described in regards to memory controller 205. Memory controller 820 stores tiles in memory 830. Memory 830 may be a single memory or a partitioned memory such as that previously described in regards to the partitioned memory of memory system 200.

A tile mode selector 840 includes a graphical surface type detector 845 that determines whether a particular graphical surface requires stencil data. Graphical surface type detector 845 may also be configured to determine whether a separate z, s tile format 815 or combined z, s tile format 810 should be used. Tile mode selector 840 generates a tile mode control signal 850 to instruct memory controller 820 which tile format 805, 810, or 815 to use for a group of pixels. Tile mode selector 840 may be implemented in different ways. As one example, tile mode selector 840 may be implemented as driver software that monitors graphics program execution and in response generates one or more mode control bits that are forwarded to memory controller 820. It will also be understood that an application program interface (API) or similar technique may be employed to facilitate software control of the tile format. Software control is particularly beneficial in cases, for example, where the graphics program has modes in which a significant percentage of a frame (or sequence of frames) does not require stencil data. This permits system 800 to select the most efficient tile format on a frame-by-frame basis as different types of graphical surfaces are generated. Additionally, system 800 can select the most efficient tile format for different regions of a frame, further improving efficiency.

In one embodiment graphics memory system 800 supports 24 bit z data, which may for example, be stored in tiles representing a 4×4 adjacent group of pixels or a 16×1 adjacent group of pixels. In a system supporting 8 bit stencil each pixel requires 24 bits for z-only tile format 805 and 32 bits for a z, s format such as tile formats 810 and 815. In this embodiment, when stencil data is not required, using a z-only tile format 805 results in a 25% improvement in memory allocation compared to using tile formats 810, 815.

FIGS. 9-12 illustrate tile formats compatible with a PCI-E implementation. In one embodiment of a 24 bit z data tile format each tile is arranged into a sequence of lines, with each line having a sequence of fields such that each line is capable of storing 16 bytes of pixel data. The fields are preferably arranged such that a relative pixel order is maintained. Each four lines may be further organized into a contiguous 64 byte memory access, i.e., 16 byte×4 line tiles. In a PCI-E implementation, 16 bytes corresponds an integer multiple of two of the minimum access size of 8 bytes. In a PCI-E implementation contiguous two-dimensional sub-regions a tile preferably map to one address range such that data fetches are contiguous in memory.

Figure 9:
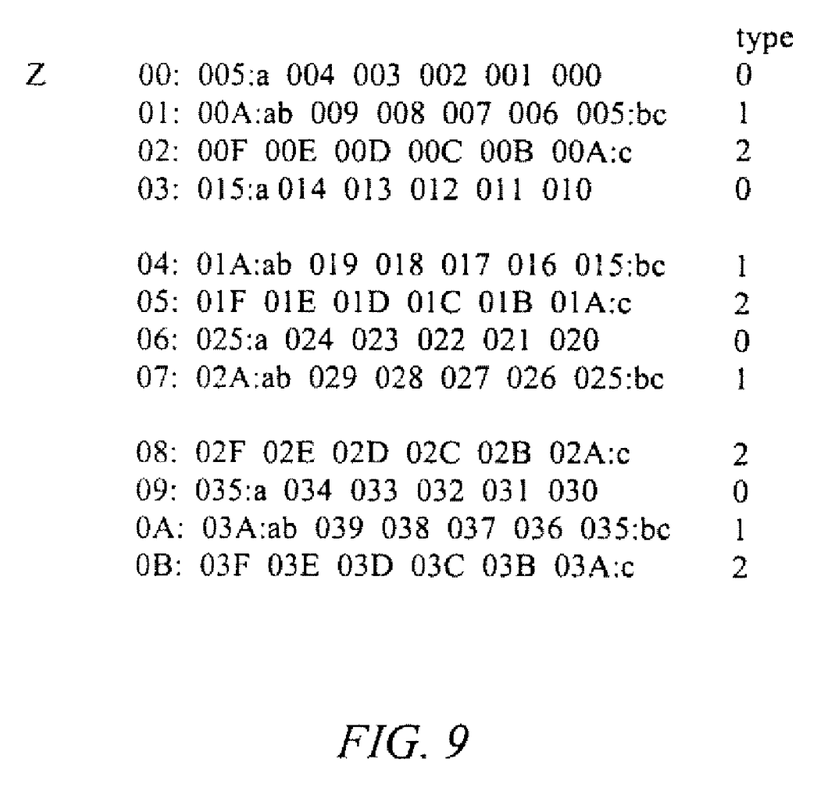
FIG. 9 illustrates a tile in accordance with one embodiment of the present invention.

FIG. 9 illustrates how pixels are organized for a 24 bit z only tile format 805 in accordance with one embodiment of the present invention. The pixel numbers within a group of pixels are represented in a hexadecimal nomenclature. For example, in a hexadecimal (base 16) the first 16 pixels may be represented as: 000, 001, 002, 003, 004, 005, 006, 007, 008, 009, 00A, 00B, 00C, 00D, 00E, and 00F. Each line includes 16 bytes of z data. Each four lines are organized into a contiguous 64 byte memory access. Since the z data for an individual pixel has three bytes of data, the z data for some pixels is split between different field positions of different lines. A field represented solely by hexadecimal numbers indicates that the field has all of the z data for the corresponding pixel. Fields with the suffix notation :abc indicate that the field stores only a portion of the total byte range, where a, b, and c correspond to specific byte ranges within each 3 byte (24 bit) z value. For example, bit positions 7:0 may correspond to the "a" suffix; bit positions 15:8 to the "b" suffix, and bit positions 23:16 may correspond to the "c" suffix.

Each entry in FIG. 9 corresponds to a field for z data for an individual pixel, with the pixel number represented alphanumerically with letters A, B, C, D, E, and F indicated in hex representation. Note that each three lines has a total data size equivalent to the z-only data for 16 pixels. Each line may also be assigned a type based upon how the line divides up z data. In one embodiment, a hardware component (not shown) accounts for pixels straddling two tiles.

Figure 10:
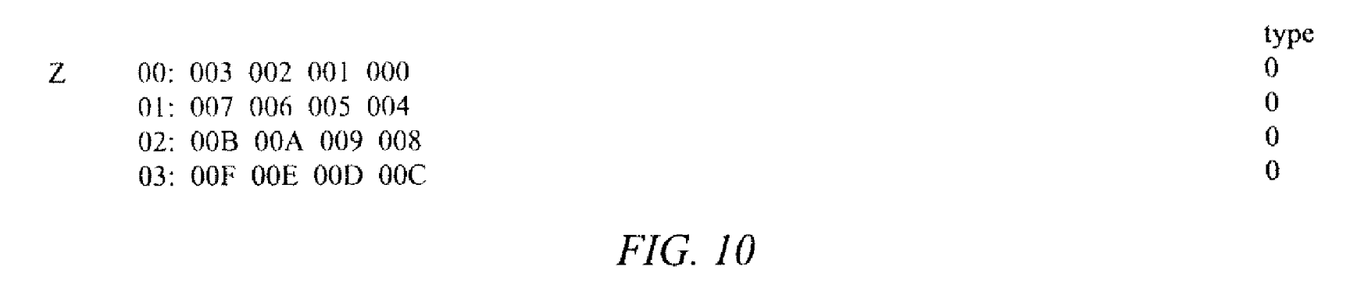
FIG. 10 illustrates an arrangement of lines in a tile in accordance with one embodiment of the present invention.

FIG. 10 illustrates how pixels are organized for a combined 24 bit z and 8 bit stencil tile format 810 in accordance with one embodiment of the present invention. Since each individual pixel has combined z, s data it has four bytes of information such that there are four fields in each 16 byte line each of which represents combined z, s data for one pixel. Thus in this example each four lines has four fields such that each four lines represents the combined z, s data of 16 pixels.

Figure 11:
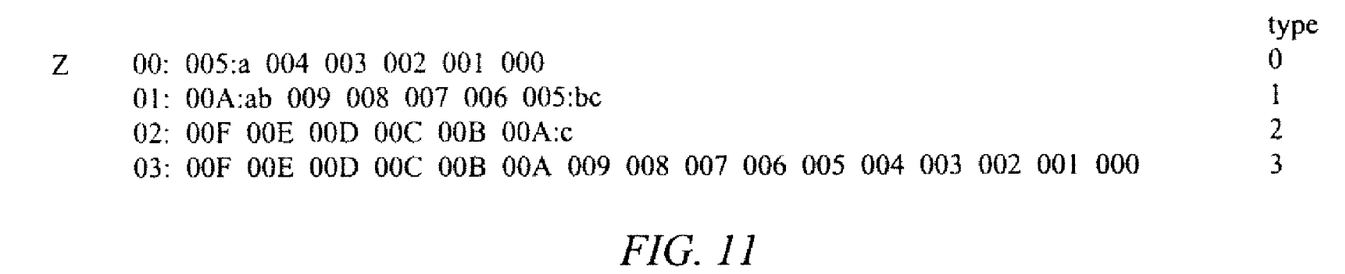
FIG. 11 illustrates an arrangement of lines in a tile in accordance with one embodiment of the present invention.

FIG. 11 illustrates an example of how pixels are organized for a separate z, s tile format 815 having 24 bit z and 8 bit stencil. The first three lines, 00, 01, and 02 contain only z data. Note that that the first three lines are identical to that in FIG. 9. The fourth line, 03, is a 16 byte line having 16 one byte entries for the stencil data of 16 pixels 000, 001, 002, 003, 004, 005, 006, 007, 008, 009, 00A, 00B, 00C, 00D, 00E, and 00F. In this embodiment the z data and the stencil data are independently addressable. Consequently, a single 48 byte memory access (e.g., a write request) can be used to access all of the z data for a tile. Alternatively, a single 16 byte memory access can be used to access all of the stencil data for the tile.

Figure 12:
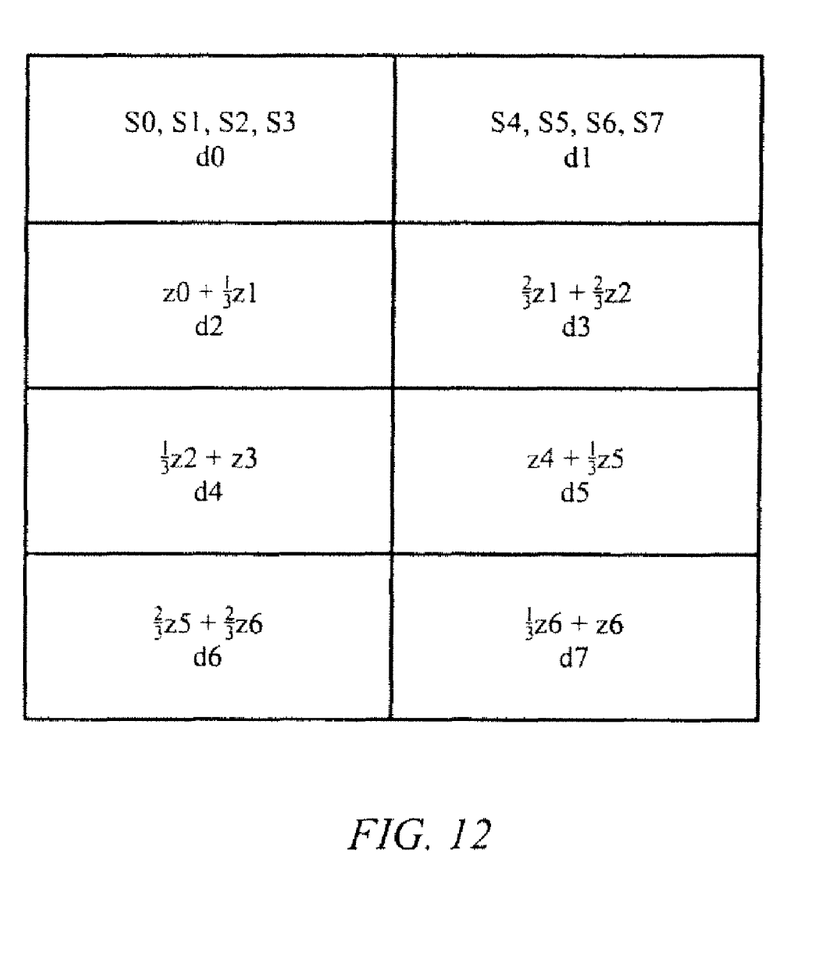
FIG. 12 illustrates an arrangement of lines in a tile in accordance with one embodiment of the present invention.

FIG. 12 illustrates another representation of the tile format of FIG. 11 into a format having separate data sections with a nomenclature similar to that of FIG. 6 but with each data section having a byte width of 8 bytes. As previously described 8 bytes corresponds to a minimum PCI-E data access size. In a PCI-F implementation, however, that data accesses to all of the data sections of the tile are to one address range, not to different sub-partitions.

In addition to improvements in memory utilization, embodiments of the present invention may also be used to reduce the number of memory accesses required to access tiled memory. One benefit of the 24 bit z tile format of FIGS. 9-12 is that it may be used to improve the efficiency of data accesses over a peripheral component interface express (PCI-E) bus. A PCI-E bus is a packet bus that has eight byte enables per packet. In PCI-E each packet has packet overhead such that the ratio of packet overhead to payload data transfer is optimized when tile data is organized into units that are integer multiples of 8 bytes. Consequently, a tile arranged to permit data transfers in integer multiples of 8 byte chunks improves the efficiency with which tile memory may be accessed via a PCI bus. Thus, in the tile format of FIG. 9, z data may be transferred in integer multiples of 8 byte chunks. The tile format of FIG. 10 permits combined z, s data to be transferred in integer multiples of 8 byte chunks. In the tile format of FIG. 11, the z data and the stencil are each separately addressable and each may also be transferred in integer multiples of 8 byte chunks. Consequently, in addition to other benefits, embodiments of the present invention may also be used to improve utilization of a PCI-E bus.

It will also be understood that the tile formats described in regards to FIGS. 11-12 may have z, s data rearranged for individual clients as combined z, s data.

As previously described, in one embodiment of a 24 bit z data tile format each tile is arranged into a sequence of lines, with each line having a sequence of fields such that each line is capable of storing 16 bytes of data. Each four lines may be further organized into a contiguous 64 byte memory access, i.e., 16 byte×4 line tiles. In one embodiment, all of the z data is stored in within the tile in pixel order without compression. However, it will also be understood that alternate embodiment may include compression of at least some of the tile data.

While an example of a tile format for 24 bit z data has been described, it will be understood that this tile format may be applied for 24 bit color data as well. In one embodiment a 16 byte×4 line tile is used to store 24 bit color data. The 24 bit color data may, for example, correspond to 8 bits for each of the red, green, and blue colors in an RGB format. In this embodiment, an 8 bit color blender would be provided in a ROP to blend any of the color channels.

As previously described, the tile format may be applied to different types of graphics memories, including those that are not sub-partitioned. It will also be understood that for an embodiment having 24 bit z data tile format or 24 bit color data tile format may also be applied to graphics memory systems which are not sub-partitioned, such as a graphics memory having either no partitions or partitions but no sub-partitions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of utilizing a tiled graphics memory in a graphics system, comprising:
    detecting via driver software that monitors execution of a graphics program whether a graphical surface is of a graphical surface type requiring stencil data and based on stencil data requirements selecting on a frame-by-frame basis a tile format to improve at least one of memory access efficiency and packing efficiency by generating a control signal that is forwarded to a memory controller;
    the driver software in response to determining that the graphical surface does not require stencil data signaling the memory controller to store data for the graphical surface using a first tile format having a plurality of fields for z data but having no fields reserved for stencil data; and
    the driver software in response to the determining that the graphical surface requires stencil data signaling the memory controller to store data for the graphical surface using a second tile format having a plurality of fields for z data and associated stencil data wherein z data and stencil data are stored in different independently addressable portions of said second tile format.

2. The method of claim 1, wherein the control signal comprises at least one control bit forwarded to the memory controller to select the tile format.

3. The method of claim 1, wherein each tile of said first tile format is arranged to store 24 bit z data for a group of adjacent pixels.

4. The method of claim 1, wherein each tile of said second tile format is arranged to store 24 bit z data and 8 bit stencil data for a group of adjacent pixels.

5. The method of claim 1, wherein a particular frame includes at least two different graphical surfaces located in different regions of the particular frame, the method further comprising:
    the driver software for a first graphical surface not requiring stencil data signaling the memory controller to store data for the first graphical surface using the first tile format; and
    the driver software for a second graphical surface requiring stencil data signaling the memory controller to store data for the second graphical surface using the second tile format.

* * * * *